(12) United States Patent
Smith et al.

(10) Patent No.: US 7,554,482 B2
(45) Date of Patent: Jun. 30, 2009

(54) SYSTEMS AND METHODS FOR USING A TCAS DIRECTIONAL ANTENNA FOR OMNIDIRECTIONAL TRANSMISSION

(75) Inventors: Mark D. Smith, Glendale, AZ (US); Gregory T. Stayton, Peoria, AZ (US)

(73) Assignee: Aviation Communication & Surveillance Systems, Phoenix, AZ (US)

( * ) Notice: Subject to any disclaimer, the term of this patent is extended or adjusted under 35 U.S.C. 154(b) by 259 days.

(21) Appl. No.: 11/786,987

(22) Filed: Apr. 10, 2007

(65) Prior Publication Data

US 2008/0174473 A1 Jul. 24, 2008

Related U.S. Application Data

(63) Continuation-in-part of application No. 10/942,727, filed on Sep. 15, 2004, now Pat. No. 7,345,626.

(60) Provisional application No. 60/790,926, filed on Apr. 10, 2006.

(51) Int. Cl.
*G01S 13/93* (2006.01)
*G01S 7/282* (2006.01)

(52) U.S. Cl. ............... 342/29; 342/30; 342/36

(58) Field of Classification Search ............ 342/29–40, 342/42–44, 46, 200–204
See application file for complete search history.

(56) References Cited

U.S. PATENT DOCUMENTS

| 4,612,549 A | 9/1986 | Greyer, Jr. et al. |
| 4,782,450 A | 11/1988 | Flax |
| 4,901,307 A | 2/1990 | Gilhousen et al. |
| 5,008,844 A | 4/1991 | Kyriakos et al. |
| 5,038,146 A | 8/1991 | Troychak et al. |
| 5,103,233 A | 4/1992 | Gallagher et al. |
| 5,191,349 A | 3/1993 | Dinsmore et al. |
| 5,280,285 A | 1/1994 | Curtis et al. |
| 5,339,086 A | 8/1994 | DeLuca et al. |
| 5,771,449 A | 6/1998 | Blasing et al. |
| 5,802,241 A | 9/1998 | Oshima |
| 5,805,111 A | 9/1998 | Brettner et al. |
| 5,818,385 A | 10/1998 | Bartholomew |
| 5,819,000 A | 10/1998 | Oshima |
| 5,880,693 A | 3/1999 | Drummer |
| 5,892,879 A | 4/1999 | Oshima |
| 5,923,293 A | 7/1999 | Smith et al. |
| 5,999,569 A | 12/1999 | Oshima |

(Continued)

FOREIGN PATENT DOCUMENTS

EP 431449 A2 * 6/1991

(Continued)

*Primary Examiner*—John B Sotomayor
(74) *Attorney, Agent, or Firm*—Alex Starkovich; Allen J. Moss; Squire, Sanders & Dempsey L.L.P.

(57) ABSTRACT

A method of transmitting from a traffic alert and collision avoidance system (TCAS) directional antenna, the TCAS directional antenna including a plurality of antenna elements connected to an integrated beam forming network, according to various aspects of the present invention comprises: providing a signal to each input of the integrated beam forming network, wherein each signal is of equal phase and equal amplitude to result in transmitting omnidirectionally from the TCAS directional antenna.

19 Claims, 12 Drawing Sheets

U.S. PATENT DOCUMENTS

| | | |
|---|---|---|
| 6,005,884 A | 12/1999 | Cook et al. |
| 6,006,070 A | 12/1999 | Wong |
| 6,009,124 A | 12/1999 | Smith et al. |
| 6,040,801 A | 3/2000 | Dawirs |
| 6,049,651 A | 4/2000 | Oshima |
| 6,052,582 A | 4/2000 | Blasing et al. |
| 6,064,320 A | 5/2000 | d'Hont et al. |
| 6,070,090 A | 5/2000 | Feurstein |
| 6,100,843 A | 8/2000 | Proctor, Jr. et al. |
| 6,112,056 A | 8/2000 | Langston |
| 6,121,914 A | 9/2000 | Cavelos et al. |
| 6,133,868 A | 10/2000 | Butler et al. |
| 6,148,219 A | 11/2000 | Engelbrecht et al. |
| 6,154,451 A | 11/2000 | Zscheile, Jr. et al. |
| 6,157,343 A | 12/2000 | Anderson et al. |
| 6,201,786 B1 | 3/2001 | Zscheile, Jr. et al. |
| 6,222,480 B1 | 4/2001 | Kuntman et al. |
| 6,233,435 B1 | 5/2001 | Wong |
| 6,256,357 B1 | 7/2001 | Oshima |
| 6,268,828 B1 | 7/2001 | Martek |
| 6,271,768 B1 | 8/2001 | Frazier et al. |
| 6,285,313 B1 | 9/2001 | Wahab et al. |
| 6,313,783 B1 | 11/2001 | Kuntman et al. |
| 6,329,947 B2 | 12/2001 | Smith |
| 6,339,399 B1 | 1/2002 | Anderson et al. |
| 6,377,613 B1 | 4/2002 | Kawabe et al. |
| 6,392,598 B1 | 5/2002 | Jones et al. |
| 6,400,317 B2 | 6/2002 | Rouphael et al. |
| 6,400,318 B1 | 6/2002 | Kasami et al. |
| 6,404,386 B1 | 6/2002 | Proctor, Jr. et al. |
| 6,433,729 B1 | 8/2002 | Staggs |
| 6,448,938 B1 | 9/2002 | Chiang et al. |
| 6,449,469 B1 | 9/2002 | Miyahara |
| 6,473,036 B2 | 10/2002 | Proctor, Jr. |
| 6,483,453 B2 | 11/2002 | Oey et al. |
| 6,496,158 B1 | 12/2002 | Ksienski et al. |
| 6,549,716 B1 | 4/2003 | Oshima |
| 6,553,239 B1 | 4/2003 | Langston |
| 6,600,456 B2 | 7/2003 | Gothard et al. |
| 6,640,110 B1 | 10/2003 | Shapira et al. |
| 6,646,599 B1 | 11/2003 | Apa et al. |
| 6,683,541 B2 | 1/2004 | Staggs et al. |
| RE38,483 E | 3/2004 | Oshima |
| 6,703,945 B2 | 3/2004 | Kuntman et al. |
| 6,710,742 B1 | 3/2004 | Meredith |
| 6,714,582 B2 | 3/2004 | Nakamura et al. |
| 6,724,976 B2 | 4/2004 | Oshima |
| 6,728,467 B2 | 4/2004 | Oshima |
| RE38,513 E | 5/2004 | Oshima |
| 6,731,920 B1 | 5/2004 | Iwai et al. |
| 6,738,044 B2 | 5/2004 | Holzrichter et al. |
| 6,751,206 B1 | 6/2004 | Padovani et al. |
| 6,753,812 B2 | 6/2004 | Rabinowitz et al. |
| 7,006,032 B2 * | 2/2006 | King et al. .................. 342/29 |
| 7,436,350 B1 * | 10/2008 | Maloratsky et al. ........... 342/30 |
| 2001/0040526 A1 | 11/2001 | Smith |
| 2002/0014986 A1 | 2/2002 | Ringwald et al. |
| 2002/0063653 A1 | 5/2002 | Oey et al. |
| 2002/0075171 A1 | 6/2002 | Kuntman et al. |
| 2002/0089432 A1 | 7/2002 | Staggs et al. |
| 2006/0057977 A1 * | 3/2006 | Smith et al. ................. 455/108 |
| 2008/0174472 A1 * | 7/2008 | Stone et al. .................. 342/30 |
| 2008/0174473 A1 * | 7/2008 | Smith et al. .................. 342/32 |
| 2009/0027258 A1 * | 1/2009 | Stayton ...................... 342/174 |

FOREIGN PATENT DOCUMENTS

| | | |
|---|---|---|
| EP | 905528 A2 * | 3/1999 |
| JP | 03231184 A * | 10/1991 |

* cited by examiner

SYSTEMS AND METHODS FOR USING A TCAS DIRECTIONAL ANTENNA FOR OMNIDIRECTIONAL TRANSMISSION

CROSS REFERENCE TO RELATED APPLICATIONS

This application claims priority from U.S. Provisional Application. No. 60/790,926, filed Apr. 10, 2006, in the name of Mark D. Smith and entitled "USING A TCAS DIRECTIONAL ANTENNA FOR OMNIDIRECTIONAL TRANSMISSION," and is a continuation-in-part of and claims priority to U.S. patent application Ser. No. 10/942,727, filed Sep. 15, 2004 now U.S. Pat. No. 7,345,626, in the name of Mark D. Smith, et al. and entitled "PULSE TRANSMITTERS HAVING MULTIPLE OUTPUTS IN PHASE RELATIONSHIP AND METHODS OF OPERATION," all of which are incorporated herein by reference in their entirety.

FIELD OF THE INVENTION

The present invention relates to systems and methods for transmitting from a traffic alert and collision avoidance system (TCAS) directional antenna, and more particularly, to transmitting omnidirectionally using a TCAS directional antenna having an integrated beam forming network.

BACKGROUND OF THE INVENTION

Avionic antennas with multiple radiating elements may be used to transmit an omnidirectional pattern or a directional pattern. The accuracy of the pattern may depend upon the accuracy of the amplitudes and phases of the signals driving the antenna. Conventional relatively high power avionic transmitters provide multiple output signals for driving an antenna having a plurality of elements. Such transmitters may include a plurality of similar circuits, each circuit driven from a common source and providing one of the output signals. A typical circuit may include a power amplifier followed by a phase shifter to set a desired output phase and compensate for phase differences introduced by different power amplifiers. The phase shifter necessarily operates at the relatively high power of the output signal. Such phase shifters are expensive and bulky. They consume power and consequently contribute adversely to the thermal characteristics of an enclosed transmitter.

Another type of conventional avionic antenna has fixed phase shift circuits, also known as a beam forming network, integral to the antenna assembly to facilitate transmitting one of a set of directional patterns. To use this antenna to transmit omnidirectionally will require an accurate phase relationship among the signals provided to the ports of such an antenna. These and other issues are addressed by the present invention.

SUMMARY OF THE INVENTION

A method of transmitting from a traffic alert and collision avoidance system (TCAS) directional antenna, the TCAS directional antenna including a plurality of antenna elements connected to an integrated beam forming network, according to various aspects of the present invention comprises: providing a signal to each input of the integrated beam forming network, wherein each signal is of equal phase and equal amplitude to result in transmitting omnidirectionally from the TCAS directional antenna.

A system for transmitting from a TCAS directional antenna, the TCAS directional antenna comprising a plurality of antenna elements connected to an integrated beam forming network, according to various aspects of the present invention comprises a transmitter in communication with the TCAS directional antenna, the transmitter for providing a signal to each input of the integrated beam forming network, wherein each signal is of equal phase and equal amplitude to result in transmitting omnidirectionally from the TCAS directional antenna.

A system for omnidirectional transmission using a TCAS directional antenna comprising a plurality of antenna elements connected to an integrated beam forming network according to various aspects of the present invention comprises a circuit in communication with the TCAS directional antenna, the circuit for receiving a first signal and providing a second signal to each input of the integrated beam forming network, wherein each second signal is of equal phase and equal amplitude to result in transmitting omnidirectionally from the TCAS directional antenna.

BRIEF DESCRIPTION OF THE DRAWING

Embodiments of the present invention will now be further described with reference to the drawing, wherein like designations denote like elements, and.

DETAILED DESCRIPTION OF EXEMPLARY EMBODIMENTS

Figure 1:
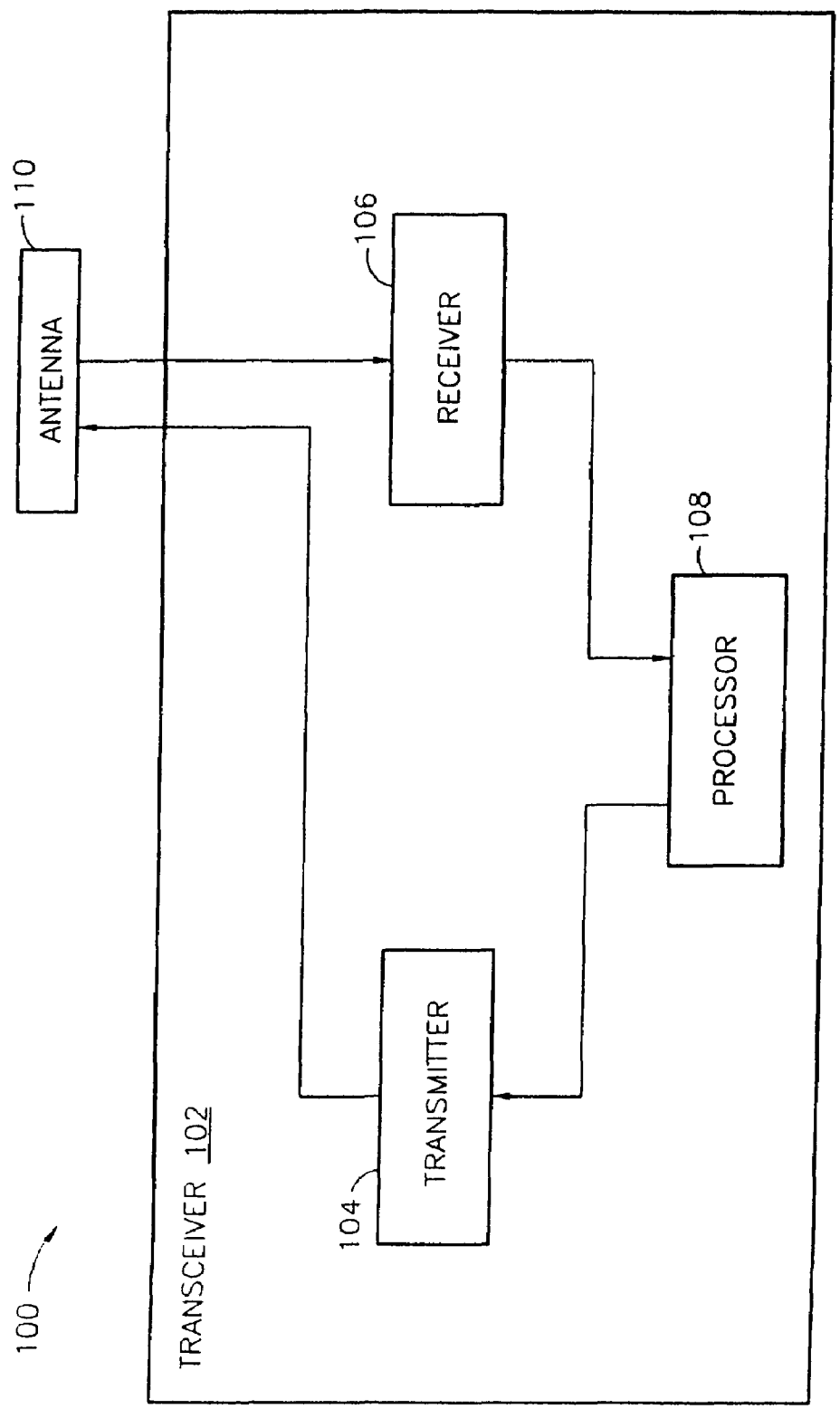
FIG. 1 is a functional block diagram of an avionics system, according to various aspects of the present invention.
Figure 2:
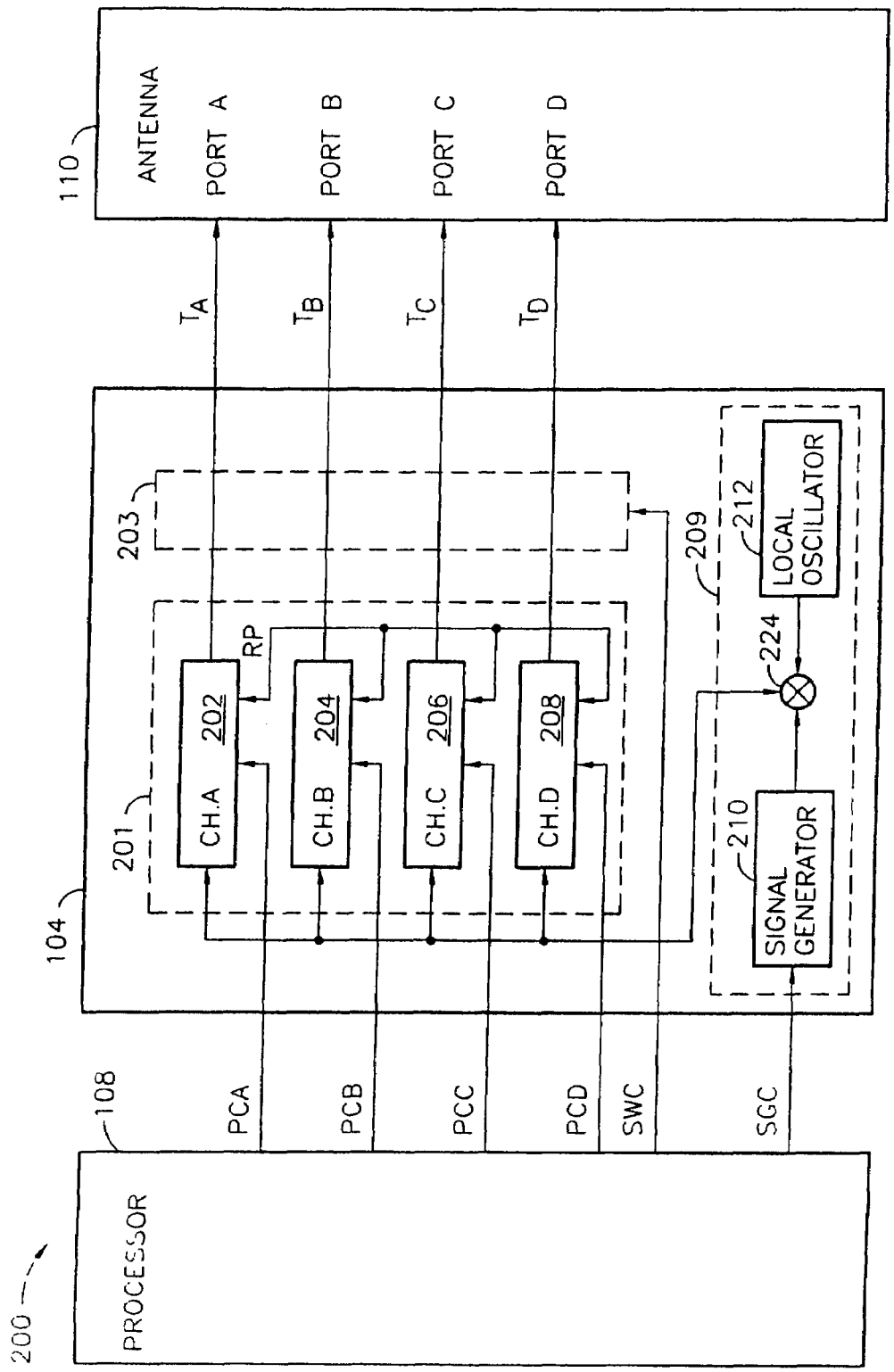
FIG. 2 is a functional block diagram of the transmitter of FIG. 1.
Figure 3:
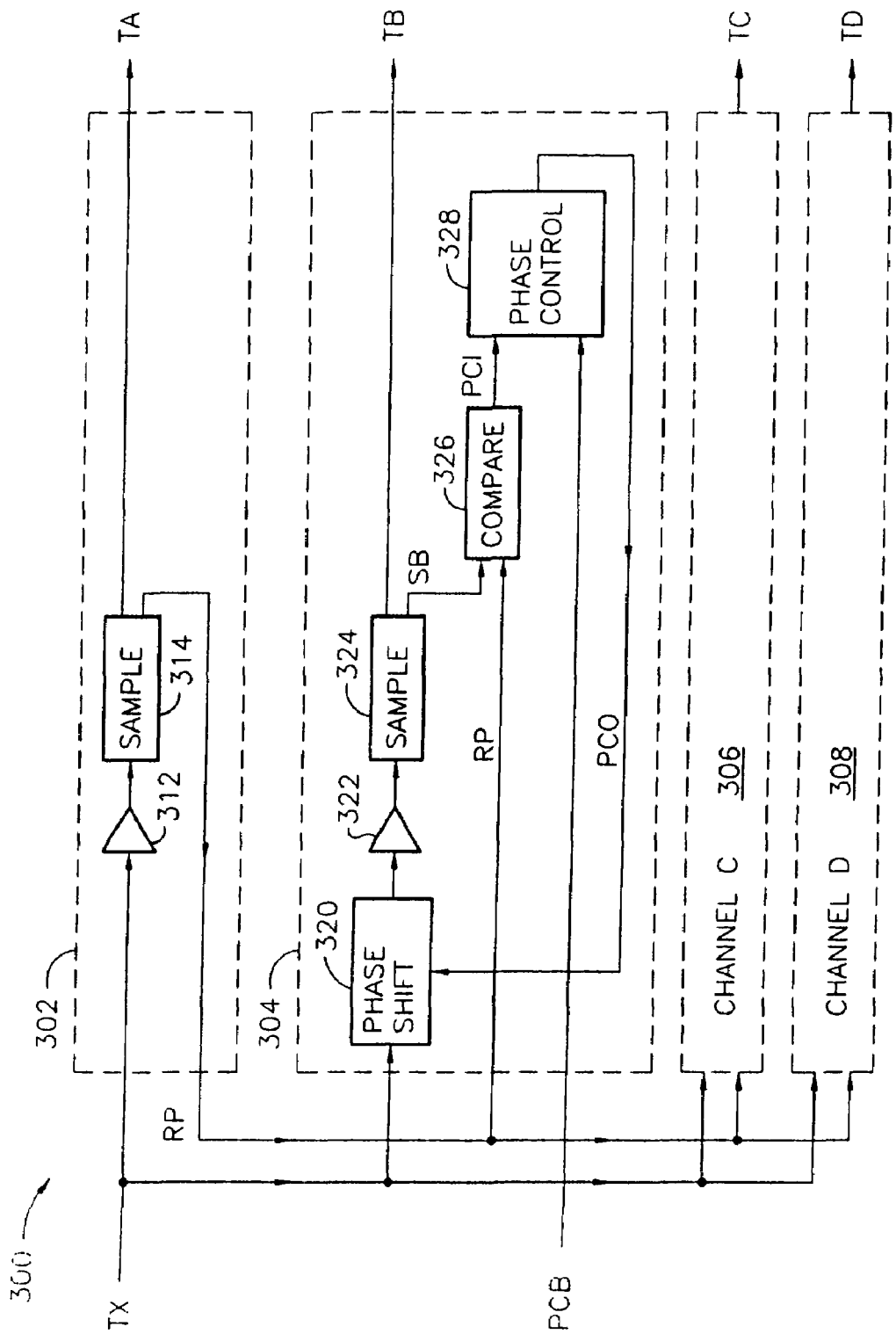
FIG. 3 is a functional block diagram of channel circuits of the transmitter of FIG. 2.

A transmitter may be coupled to an antenna for directional and omnidirectional transmitting for communication, flight safety, and assuring the success of a mission. Communication may include transmitting pulses of radio frequency energy (e.g., a train of individual pulses) where each pulse includes several periods of a radio frequency signal. Communication may include transmitting data in a keyed modulation (e.g., on-off keyed, pulse position modulation, phase shift keyed).

Transmitted signals may conform to one or more protocols including protocols used with conventional Air Traffic Control Radar Beacon Systems, conventional transponders (e.g., Identification Friend or Foe, Mode A, Mode C, Mode S, Mode 5), Traffic Alert and Collision Avoidance Systems, the Automatic Dependent Surveillance—Broadcast protocol, universal access transceiver (UAT), and network communication (e.g., airborne data links, station keeping equipment). Such a transmitter may be located on a vehicle (e.g., on land or airborne) or located in a relatively fixed location (e.g., ground-based traffic monitoring and/or control). In any of these applications, a transmitter may provide multiple outputs for driving one or more antennas, antenna elements, or circuits coupling a transmitter to an antenna or antenna element. According to various aspects of the present invention, suitable phase relationships between transmitter output signals may be established and/or maintained while transmitting relatively high energy pulses. Consequently, one or more accurate spatial radiation patterns may be obtained from the antennas or antenna elements used for transmitting the relatively high energy pulses. An accurate spatial radiation pattern contributes to accurate location information of a target (e.g., a responding transponder) at a previously unknown location. Further, accurate spatial radiation patterns contribute to transmitting to a desired location with less energy, resulting in less interference with other systems using radio communication.

A transmitter, according to various aspects of the present invention, may be a stand alone transmitter or integrated with a receiver. For example, system 100 of FIGS. 1-4, includes antenna 110 coupled to transceiver 102. When transmitting, transceiver 102 provides a plurality of signals to antenna 110 in a set of phase relationships between the signals. Any desired phase relationship may be a function of transceiver design, antenna design, installation of system 100 (e.g., distance between transceiver 102 and antenna 110, orientation of antenna 110), and/or operation of system 100 (e.g., a mix of directional and omnidirectional transmitting).

The antenna 110 may include any conventional antenna that is driven by one or more transmitter output signals. The antenna 110 may include multiple antennas, each driven by a transmitter output signal; multiple antenna elements, each driven by a transmitter output signal; or multiple antenna circuits, each driven by a transmitter output signal. The antenna 110 may be positioned in any suitable location, such as attached to the surface of an aircraft. The antenna 110 may operate in conjunction with any other desired systems, such as with a ground-based collision-avoidance system. The antenna 110 may comprise, and/or operate in conjunction with, any other desired systems and devices.

Figure 7:
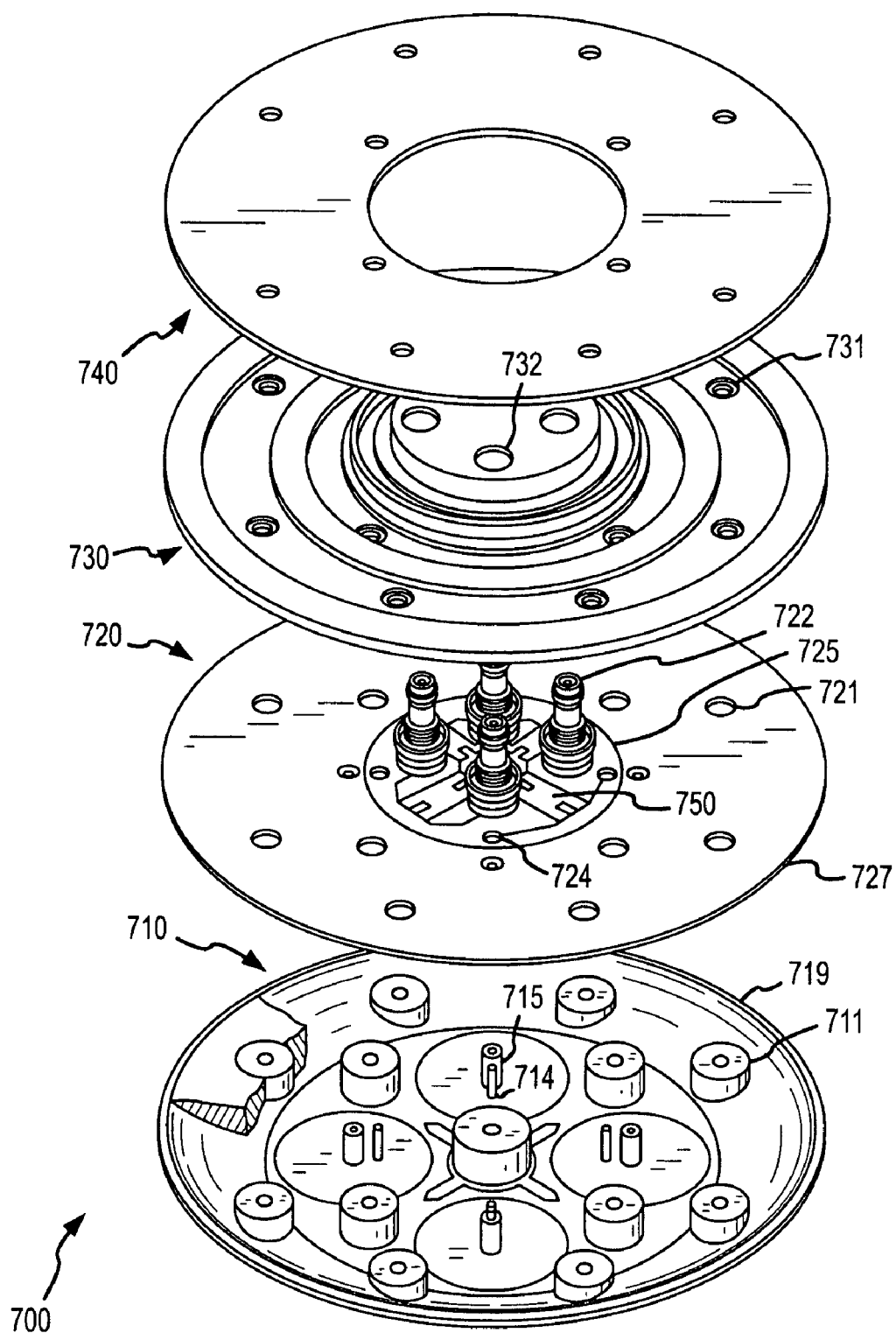
FIG. 7 is an exploded view of one embodiment of a conventional directional antenna.

One exemplary embodiment of the present invention operates in conjunction with a TCAS directional antenna of the type described in U.S. Pat. No. 5,191,349 by Dinsmore. FIG. 7 illustrates an exploded view of the TCAS directional antenna 700 as taught in U.S. Pat. No. 5,191,349. The TCAS directional antenna 700 includes a radome assembly 710, a ground plate assembly 720, base plate 730, and adapter plate 740. The radome 719 has fabricated on an interior surface various structures including fastening posts 711, grounded portions of monopole antenna elements 715, and free portions of the monopole antenna elements 714.

The ground plate 720 includes a conducting plate 727 with apertures 721 formed in the conducting plate 727 to permit the passage therethrough of the fasteners coupling the antenna to the adapter plate 740 or to an aircraft. A beam forming circuit card assembly 725 is mechanically coupled to the ground plate 727. Apertures 724 are positioned to permit the free antenna element portions 714 to extend through the conducting plate 727 and through the beam forming circuit card assembly 725. Coupled to the ground plate 720 and the coupled circuit card assembly 725 are four connectors 722 which electrically couple the processing and signal generating apparatus of an aircraft to the beam forming circuit 750 on the circuit card assembly.

The base plate 730 provides structural support for the antenna. The base plate 730 includes apertures 731 through which pass the fasteners coupling the antenna to the adapter plate 740 or to the aircraft. The base plate 730 also includes apertures 732 through which pass the electrical connectors 722, the electrical connectors coupling the antenna 700 and an aircraft electrical apparatus.

The adapter plate 740 is used to adapt the antenna to any specified surface configuration, such as the surface of an aircraft. The adapter plates are structured to permit coupling screws and the connector 722 to pass therethrough. The multiplicity of fastening structures and associated apertures permit strong mechanical coupling to a support structure, such as the structure of an aircraft.

The TCAS directional antenna 700 depicted in FIG. 7 is conventionally used for directional transmitting and may also be used for omnidirectional transmitting. In one method for transmitting omnidirectionally using the TCAS directional antenna 700 according to the present invention, four transmitter output signals are provided to the four antenna connectors 722. The four transmitter output signals are driven in substantially in phase (e.g., ideally with zero phase difference between any two of the four transmitter output signals) and have substantially equal amplitude. Those skilled in the art will recognize that systems and methods for omnidirectional transmission according to the present invention may be practiced with minor variations in the phase and amplitude of the output signals provided to the antenna connectors 722.

Figure 8:
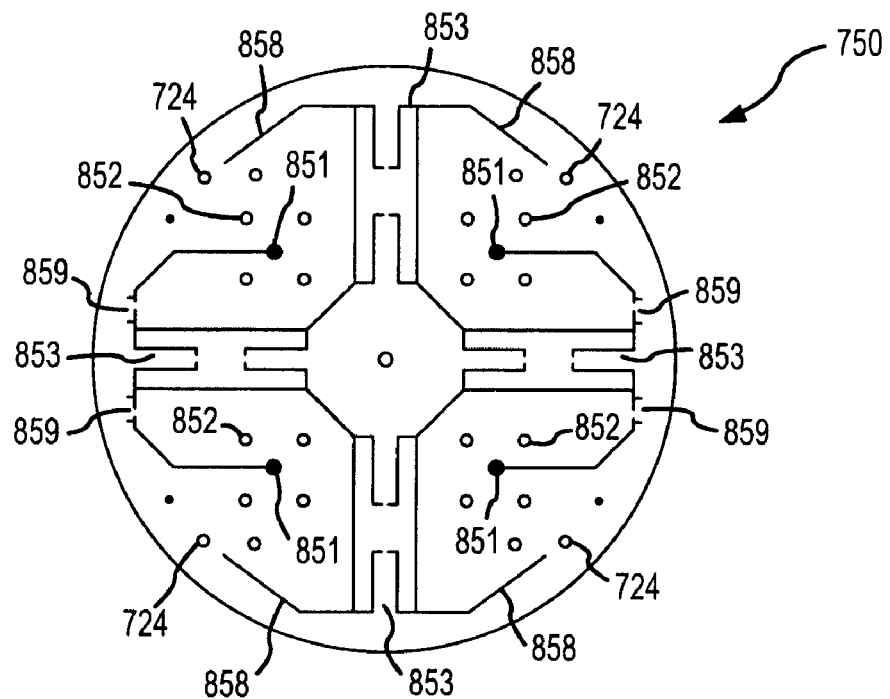
FIG. 8 is a plan view illustrating components of a beam forming network used in the conventional directional antenna of FIG. 7.

FIG. 8 depicts the components of the beam forming network 750 formed on the beam forming circuit card 725 shown in FIG. 7. The terminals 851 are each coupled to one of the electrical connectors 722. Of the four power dividing components 853, two of the power dividing components positioned on opposite sides of the center of the beam forming circuit network 750 are coupled to two of the terminals 851. Each of the power dividing components coupled to the terminals 851 are coupled to the two remaining power dividing components 853. The two remaining output power dividing components are each coupled through a ¼ wave transformer 858 to a free antenna element portion extending through aperture 724. The coupling of the ¼ wave transformer 858 to the antenna element is accomplished by a contact (not shown). The conducting strip between each side of a power dividing component 853 includes a capacitor (shown as component 934 in FIG. 9). The capacitor is essentially a short circuit at operational frequencies and is used for test purposes. The components 859 are each a resistor and capacitor coupled in parallel, which are used for test purposes.

Figure 9:
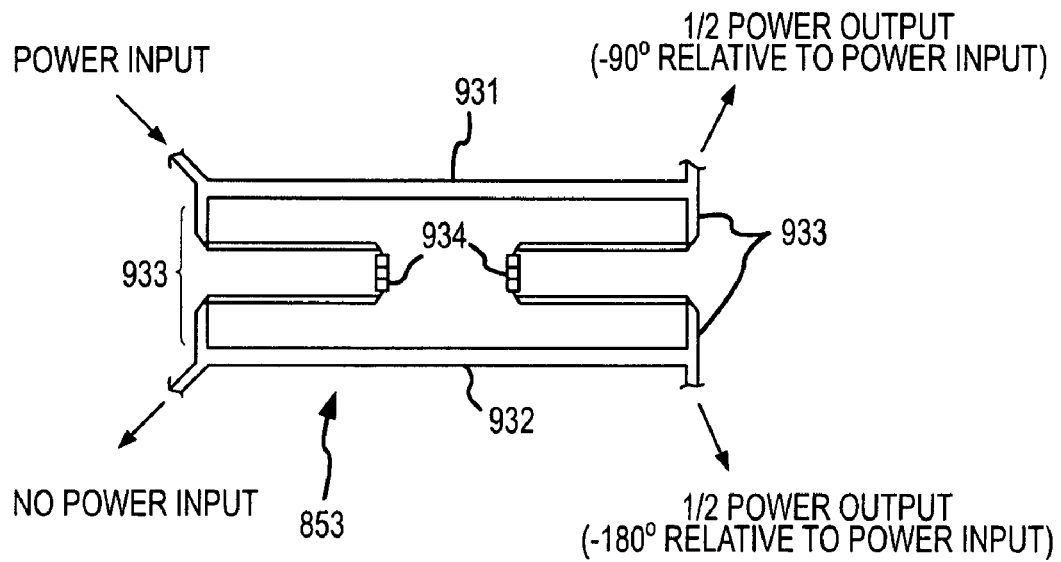
FIG. 9 illustrates the operation of the power dividing component used in the beam forming network illustrated in FIG. 8.

The operation of a power dividing component 853 is illustrated in FIG. 9. The power dividing component 853 includes two parallel conducting strips 931 and 932. The ends of the conducting strips 931 and 932 are coupled by conducting strips 933. (The conductors 933 include the capacitors 934 which are used for test purposes). When input power P with 0.degree. phase is applied to one end of a conducting strip 931, the second end of conducting strip 931 provides an output power ½P with −90.degree. phase relative to the input power. The end of conducting strip 932 proximate the end of conducting strip 931 to which the power P has been applied provides no power output. The end of conducting strip 932, opposite to the end providing no power output, provides an output power of ½P with −180.degree. phase relative to the input power.

Figure 10:
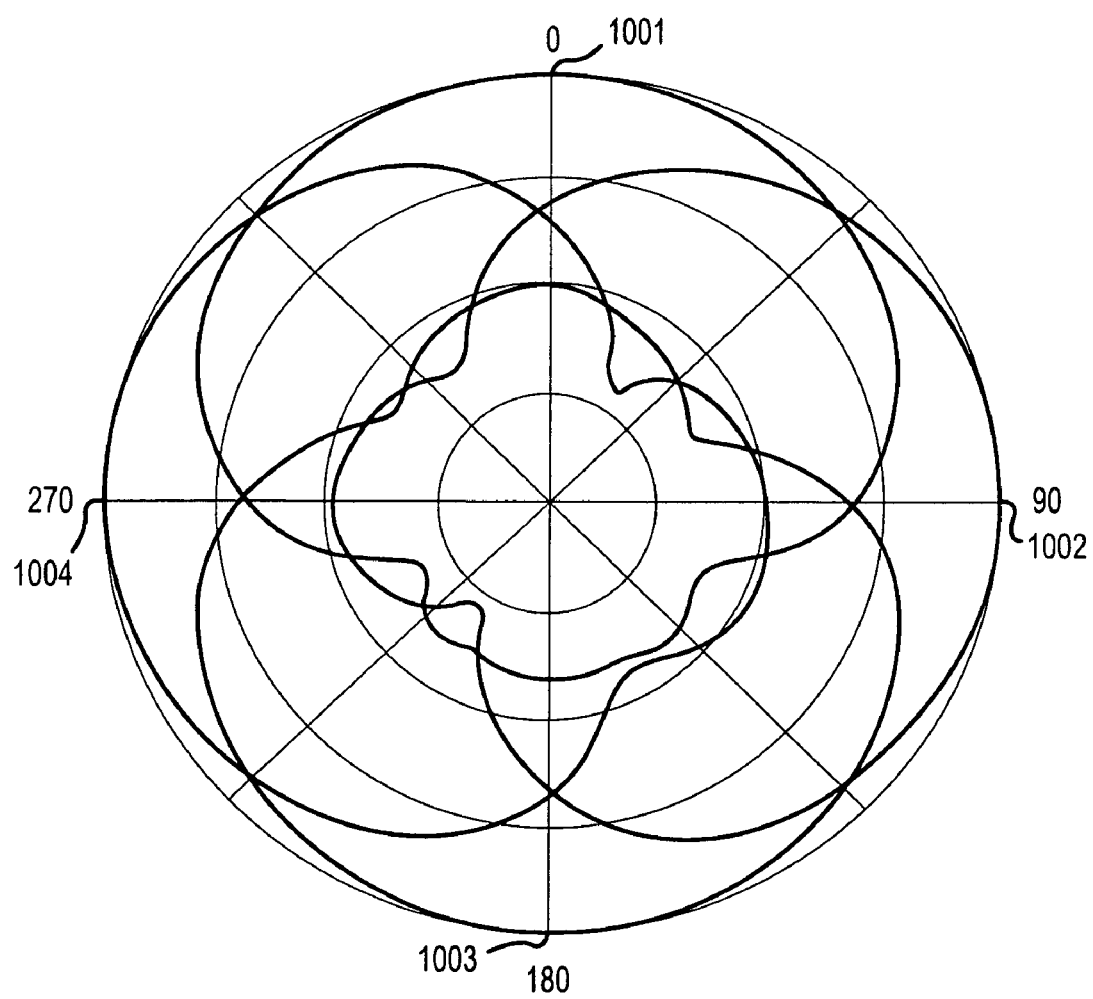
FIG. 10 illustrates directional transmission patterns produced by the Traffic alert and Collision Avoidance System (TCAS) antenna according to various aspects of the present invention.
Figure 11:
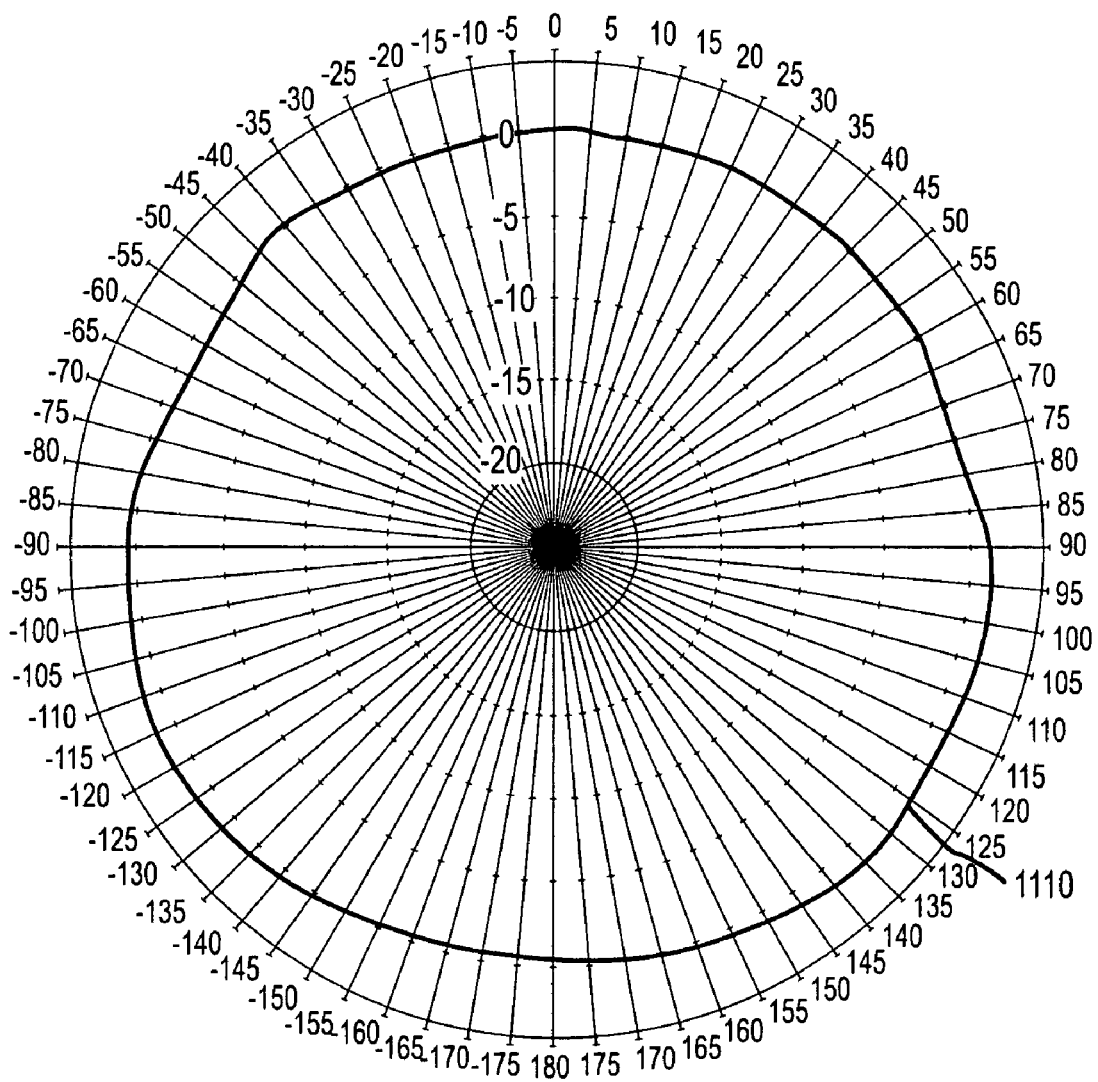
FIG. 11 illustrates the omnidirectional transmission pattern produced by the Traffic alert and Collision Avoidance System (TCAS) antenna according to various aspects of the present invention.

FIG. 10 shows the signal intensity patterns produced by each of the electrical connectors 722. Each of curves 1001 (the 0.degree. radiation lobe), 1002 (the 90.degree. radiation lobe), 1003 (the 180.degree. radiation lobe), and 1004 (the 270.degree. radiation lobe) represents a relative signal amplitude for each electrical connector as a function of angle. When only one electrical connector 722 is activated, only one of the curves displayed in FIG. 10 is generated, thereby providing a directional radiation pattern. When all four electrical connectors 722 are simultaneously driven with a signal of substantially equal phase and equal amplitude, the omnidirectional pattern 1110 depicted in FIG. 11 is generated.

Figure 12A:
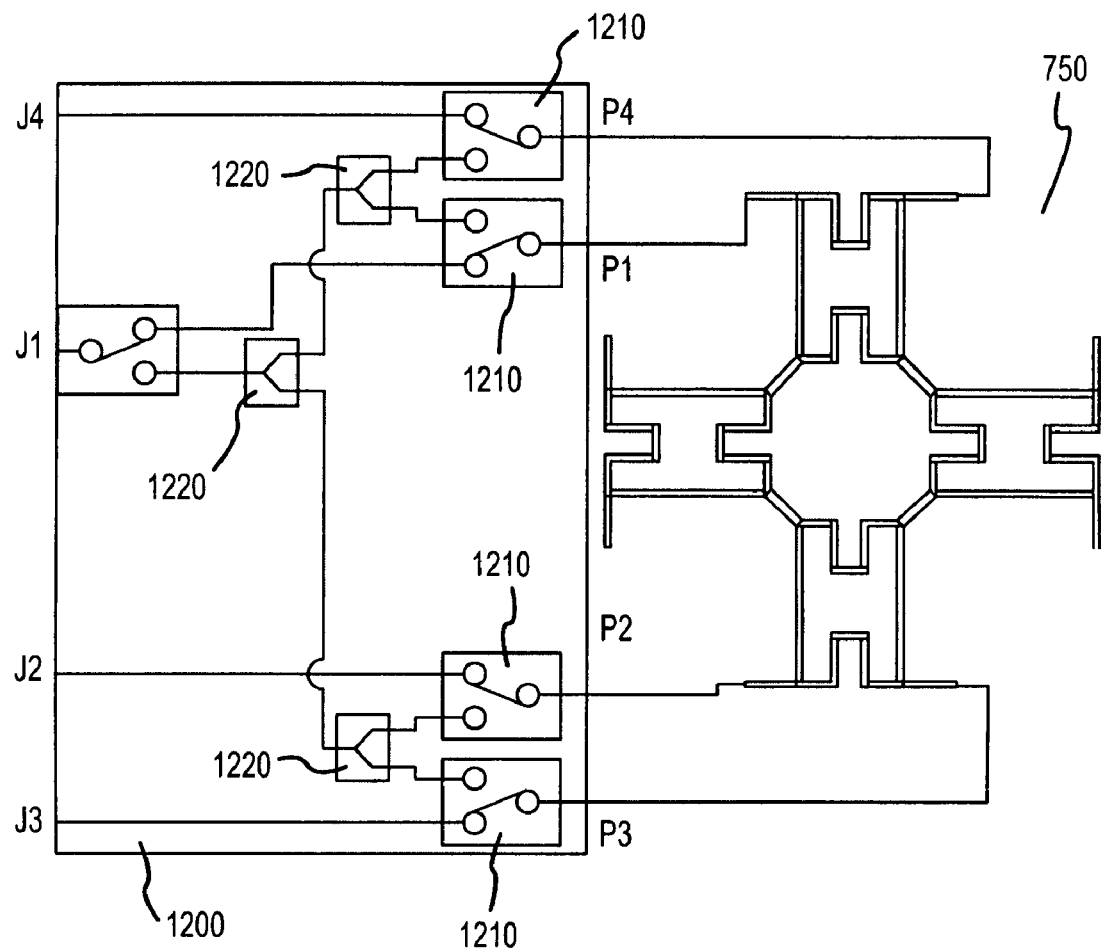
FIGS. 12A and 12B are block diagrams of a switch/divider matrix coupled to a beam forming network to allow directional and omnidirectional transmission from the conventional directional antenna depicted in FIG. 7, according to various aspects of the present invention.

The antenna 110 may include, and/or operate in conjunction with, any other desired circuits, systems, and devices. In one exemplary embodiment of the present invention, referring to FIG. 12A and 12B, the antenna 110 includes a switch/divider network 1200 connected to the beam forming network 750 to allow directional and omnidirectional transmission using a TCAS directional antenna 700 without requiring a transmitter to provide the antenna 110 with signals of equal phase and equal amplitude. The switch/divider network 1200 may communicate with the beam forming network 750 in any suitable manner. For example, the switch/divider network 1200 may connect to electrical connectors P1-P4 of the beam forming network 750. Alternatively, the switch/divider network 1200 and the beam forming network 750 may be part of the same circuit. In FIG. 12A, each switch 1210 is toggled to allow directional transmission. In operation, a single signal is provided to one of the inputs (J1, J2, J3, or J4) of the switch/divider network 1200. The signal is passed directly through to the corresponding electrical connectors 722 (P1, P2, P3, or P4) of the beam forming network 750, causing the TCAS directional antenna 700 to generate a directional signal. While the switch/divider network 1200 is integrated into the antenna 110 in this exemplary embodiment, the switch/divider network 1200 may operate externally to the antenna 110.

Figure 12B:
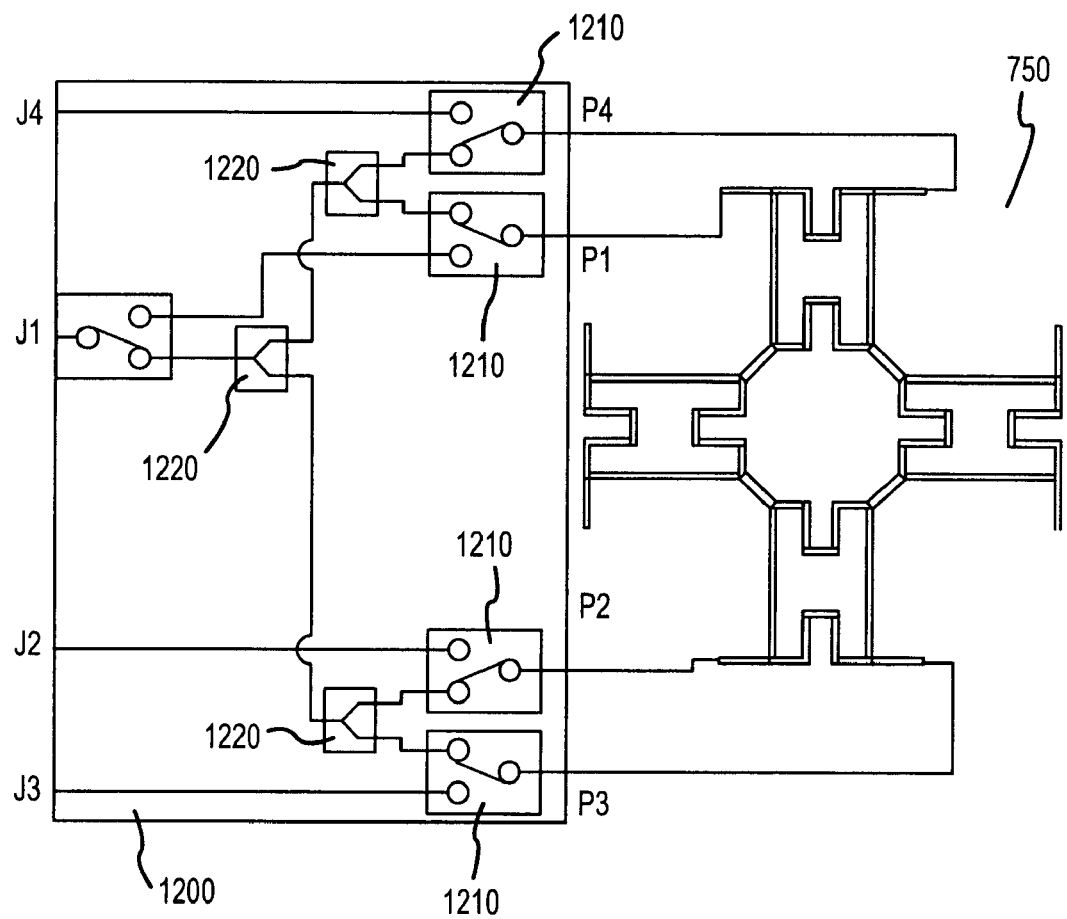

Alternatively, as shown in FIG. 12B, the switches 1210 may be toggled to allow omnidirectional transmission. In operation, a single signal is provided to input J1 of the switch/divider network 1200. The signal is routed through the dividers 1220 to provide signals of equal phase and equal amplitude to each electrical connector 722 of the beam forming network 750 (P1, P2, P3, and P4) to generate an omnidirectional transmission from the TCAS directional antenna 700.

Figure 13:
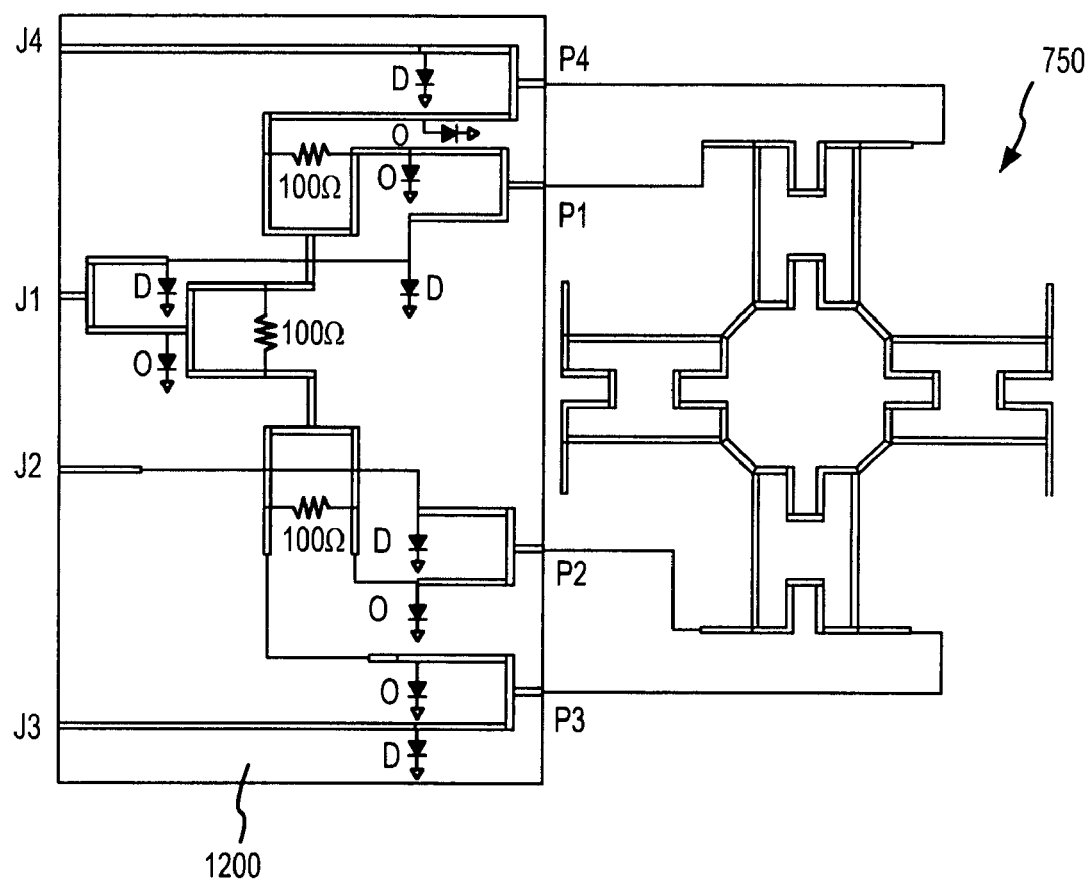
FIG. 13 is an exemplary schematic diagram of the switch/divider matrix circuit depicted in FIGS. 12A and 12B.

The switch/divider network 1200 may be implemented in any manner. FIG. 13 depicts a schematic diagram of an exemplary switch/divider network in accordance with the present invention. The schematic diodes (marked O and D) in FIG. 13 represent PIN diodes implementing high power switches. Any other method of switching may be used in conjunction with the present invention. In this exemplary embodiment, the diodes marked D represent PIN diodes which, when reverse biased, enables directional transmission from the antenna by allowing a signal input on J1, J2, J3, or J4 to pass through to P1, P2, P3, or P4, respectively. The diodes marked O represent PIN diodes which, when reverse biased, enables omnidirectional transmission from the antenna by routing a single signal provided on J1 through a network of dividers to provide signals of equal phase and equal amplitude to P1-P4. In the present exemplary embodiment, the diodes marked D are always biased in a complementary state as compared to the diodes marked O. Thus, when the O diodes are reverse biased, the D diodes are forward biased, and vice versa. The dividers shown in FIG. 13 are two-way Wilkenson resistive dividers known in the art, though any other desired divider may be used in accordance with the present invention. The Wilkenson resistive dividers in this exemplary embodiment each include a 100-ohm resistor, however any appropriate resistance value may be used.

The bias of the PIN diodes can be controlled in any appropriate manner, such as by using two voltages delivered from a computer processor to the antenna using two RF antenna cables. Additionally, a control signal to drive the antenna into the correct operating mode may be delivered over a third RF antenna cable. In an alternate embodiment of the present invention including a switch/divider network 1200, such as the one depicted in FIG. 13 where the diodes marked O are always in a complementary state compared to the diodes marked O, all the O diodes may be connected to a first voltage from an RF antenna cable while all the D diodes may be connected to a second voltage from a second RF antenna cable. In this exemplary embodiment, the voltages to the O diodes and D diodes may be controlled by a computer processor, thereby eliminating the need for a control signal feed to the antenna.

For omnidirectional transmission, an input signal provided to J1 is divided into four equal phase and equal amplitude signals that are provided to the four electrical connectors 722 of the beam forming network 750 (P1, P2, P3, and P4). As a result of dividing the input signal on J1, the amplitude of the four signals provided to P1-P4 may be less than the amplitude of the input signal. For example, in the exemplary switch/divider 1200 depicted in FIG. 13, the four output signals to P1-P4 may be one-quarter the amplitude of the input signal to J1.

The antenna 110 may transmit and/or receive any number and/or type of signals. For example, the antenna 110 may transmit or receive a Mode S signal having a frequency of 1090 MHz, a universal access transceiver (UAT) signal having a frequency of 978 MHz, and/or a TCAS signal having a frequency of 1030 MHz. The antenna 110 may transmit and/or receive any other signal having any other desired characteristics.

Transceiver 102 includes transmitter 104, receiver 106, and processor 108. Transmitter 104 and receiver 106 may be coupled to antenna 110 in any conventional manner (e.g., via an antenna switching circuit, not shown). Processor 108 may control transmitter 104 to generate desired transmitter output signals for use in transmitting via antenna 110. Processor 108 may also process signals received via antenna 110 and receiver 106. Processor 108 may include any conventional processor (e.g., a stored program computer) that implements communication as discussed above. In another implementation (e.g., 200 of FIG. 2), receiver 106 is omitted.

A transmitter, according to various aspects of the present invention, provides a plurality of transmitter output signals having a set of phase relationships to an antenna as directed by a processor. For example, in system 200 of FIG. 2, processor 108 provides to transmitter 104 a plurality of phase control signals PCA, PCB, PCC, and PCD. Each phase control signal (e.g., PCB) may be implemented in any conventional manner (e.g., one or more analog signals, one or more digital signals in serial and/or parallel format). Processor 108 also provides to transmitter 104 a signal generator control signal to convey one or more of the information to be transmitted and/or control of the format and/or timing of transmitting. Transmitter 104 provides four transmitter output signals TA, TB, TC, and TD coupled to four ports of antenna 110. Each transmitter output signal (e.g., TA) may be implemented in any conventional manner (e.g., single ended or balanced on one or more conductors). Alternate implementations use any number of channels (e.g., 2, 3, 6, 8) with suitable controls for cooperation with alternate antennas, elements, and antenna circuits.

A particular set of phase relationships among transmitter output signals may be desired at any convenient points between transmitter 104 and antenna 110. At radio frequencies, phase relationships may be affected (e.g., adversely) by differences in circuits (in 104 and/or 110) and by differences in propagation of signals (e.g., length and nature of conductors and paths). For example, in an implementation and installation where considerable distance exists between transmitter 104 and antenna 110, a particular set of phase relations may be measured at the transmitter end of interconnecting cables, at the antenna end of interconnecting cables, at any set of points between transmitter 104 and antenna 110, or a combination of these locations. A desired set of phase relationships may then be determined by analysis and/or tests. Operation of a transmitter, according to various aspects of the present invention, may implement the desired set of relationships.

A transmitter may include a plurality of substantially identical circuits, each circuit for providing one of the transmitter output signals. For example, transmitter 104 includes a modulator 209, a plurality 201 of channel circuits, and may include a matrix switch 203 (shown in straight through form) so that any channel circuit may be used to provide any transmitter output signal. Such a matrix switch may be controlled in any conventional manner, for example, by processor 108. To transmit omnidirectionally via antenna 110, channel circuits 201 may be controlled to transmit equal phase, equal amplitude signals to each port of antenna 110. To transmit directionally via antenna 110, one or more of channel circuits 201 may be controlled to transmit signals of any desired phase and amplitude to one or more ports of antenna 110.

Modulator 209 includes conventional signal generator 210, conventional mixer 224, and conventional local oscillator 212 coupled and, as desired, programmed by processor 108, to provide signal TX to be transmitted. Signal TX may be coupled to each of the channel circuits of plurality 201.

Channel circuits may be of two types. A first type provides a reference signal used by each channel circuit of the second type. For example, plurality 201 includes circuit 202 for channel A of the first type and circuits 204, 206, and 208 for channels B, C, and D of the second type. Channel A provides a reference phase signal RP coupled to each of channels B, C, and D. In another implementation, all channel circuits are identical and capable of operation as the first or second type as directed by processor 108.

Each channel circuit of the second type (e.g., for operation as a circuit of the second type) receives from processor 108 a respective phase control signal as discussed above (PCA, PCB, PCC, and PCD).

System 200 may be operated with an antenna of the type described by Dinsmore as described in Table 1. Ports of the Dinsmore antenna are described herein as physically arranged in clockwise order A-D. Phases are relative to the phase of signal PCA. In Table 1, matrix switch 203 is omitted or is programmed for straight through coupling. In an alternate implementation signal PCA is fixed or omitted (with commensurate simplification of channel circuit 202), phases are relative to signal TA, and various directions are determined by matrix switch 203.

TABLE 1

| PCA | PCB | PCC | PCD | SGC | Antenna Pattern |
|---|---|---|---|---|---|
| 0° | 0° | 0° | 0° | ATCRBS squitter or Mode S reply | omnidirectional |
| 0° | none | none | none | TCAS interrogation or resolution | directional - fore |
| none | 0° | none | none | TCAS interrogation or resolution | directional - starboard |
| none | none | 0° | none | TCAS interrogation or resolution | directional - aft |
| none | none | none | 0° | TCAS interrogation or resolution | directional - port |

A plurality of channel circuits, according to various aspects of the present invention, includes one channel circuit that provides a signal conveying indicia of a reference phase provided to all other channel circuits of the plurality. For example, plurality of channel circuits 300 of FIG. 3 may be used in place of plurality 201 of FIG. 2 omitting signal PCA as discussed above. Circuits 300 include channel circuit 302 (of the first type as discussed above) and identical channel circuits 304-308 (of the second type). Each channel circuit includes a power amplifier 312, 322 and a sample circuit 314, 324. Channel circuits 302-308 further include a compare circuit 326 and a phase control circuit 328.

Amplifier 312 amplifies transmission signal TX in any conventional manner to provide signal TA at a power sufficient to drive antenna 110 PORT A. One or more laterally-diffused metal-oxide-semiconductor (LDMOS) transistors are preferred. Amplifiers 312, 322 are substantially identical in function and structure. Programmable gain and phase control may be integral to amplifiers 312 and/or 322 as controlled by processor 108. Amplifiers 312, 322 may include frequency multiplication capability (e.g., doubler, divider), for example, for economies in design of modulator 209. Each amplifier may have a unique phase shift due to physical differences (e.g., variation in circuit or layout, variation in components and manufacturing, variation in operating temperature, variation in load).

A modulation may be implemented in amplifier 312 (or any stage of amplifier 312). For example, gain control or a switch may be used for on-off keying for pulse position modulation or for phase shift keying. In such an implementation signal TX may be continuous carrier at the radio frequency to be transmitted.

Sample circuit 314 provides an output signal that conveys indicia of the phase of output signal TA in any conventional manner while output signal TA is available at up to full output power. For example, sample circuit 314 provides indicia of a reference phase via signal RP to other channels 304-308. The phase indicated in an output of each sample circuit 314, 324 (RP, SB), may differ somewhat from the phase of the sampled signal (TA, TB) due to physical differences (e.g., variation in circuit or layout, variation in components and manufacturing, variation in operating temperature, variation in load). As discussed below, phase compensation is provided by a plurality of channels cooperating according to various aspects of the present invention so as to reduce the effect of undesired phase differences among transmitter output signals. Because circuits as discussed herein may provide a relatively wide range of phase compensation at full power of transmitter output signals, design variation among channel circuits may be tolerated permitting more economical circuit layout and manufacturing (and improved reliability).

A compare circuit compares indicia of phase from several sources and provides a signal having indicia of a phase difference. For example, compare circuit 326 receives signal RP from sample circuit 314 and signal SB from sample circuit 324. Compare circuit 326 provides a signal PCI that conveys indicia of an algebraic difference in phase between the phases indicated by signals RP and SB. A channel circuit may conform to principles of conventional feedback control circuit design having an error signal corresponding to or included in signal PCI. In a preferred implementation the output signal of a sample circuit includes a radio frequency having a phase indicative of the phase of the sampled signal. Compare circuit 326 may include a conventional mixer that provides a direct current signal having a magnitude proportional to the algebraic difference in phase between RP and SB. In another implementation, sample circuits and compare circuits may be implemented with digital techniques (e.g., amplitude normalization and amplitude sampling) and/or include digital to analog conversion (e.g., producing signal PCI in a serial or parallel digital format).

A phase control circuit provides a control signal to adjust the phase of a transmitter output signal. The control signal may be coupled to a phase shift circuit and/or an amplifier as discussed above. For example, phase control circuit 328 receives a signal having phase control information (PCI) from compare circuit 326 and a signal having a set point phase value (PCB) from processor 108. Circuit 328 provides a phase control output signal PCO to phase shift circuit 320. Signal PCO is preferably in a digital form for selectively operating cumulative discrete phase control elements of phase shift circuit 320.

Phase control circuit 328 may respond to signal PCI with an update in the adjustment value of signal PCO in a continuous (e.g., analog), periodic, conditional (e.g., when a change in PCI or PCB exceeds a limit amount), or ad hoc manner (e.g., at times prescribed by processor 108). The adjustment value may be in accordance with signal PCI currently or at one or more suitable times in the past. Criteria for updating the adjustment value of signal PCO may be determined by phase control circuit 328 and/or by processor 108. For example, phase control signal PCB may indicate an instant in time (or a period) when signal PCI is valid due to characteristics of the transmission signal.

Operation of the feedback loop consisting of phase shift circuit 320, amplifier 322, sample circuit 324, compare circuit 326, and phase control circuit 328 may be closed-loop (e.g., continuous with substantially no delay between changes in PCI and PCO), closed for a period of time and then opened (a final adjustment per signal PCO being maintained by phase shift circuit 320), or discontinuous (signal PCI sampled or averaged over several samples then signal PCO updated at any suitable time after sampling or averaging).

Signal PCI may be subject to preliminary filtering so that a filtered result provides a basis for a next adjustment value of signal PCO. Signal PCO may be subject to filtering so that changes in adjustment value are limited to a maximum step size per adjustment over a step duration. Consequently, undesired bounce, jitter, and hunting may be reduced in the feedback loop. By reducing bounce, jitter, and/or hunting, undesired phase and frequency noise may be reduced in the transmitter output signal (TB) and stresses (e.g., local heating) may be reduced in circuits and components of the loop. When transmitting is not continuous, changes to signal PCO may be made when not transmitting.

Figure 4:
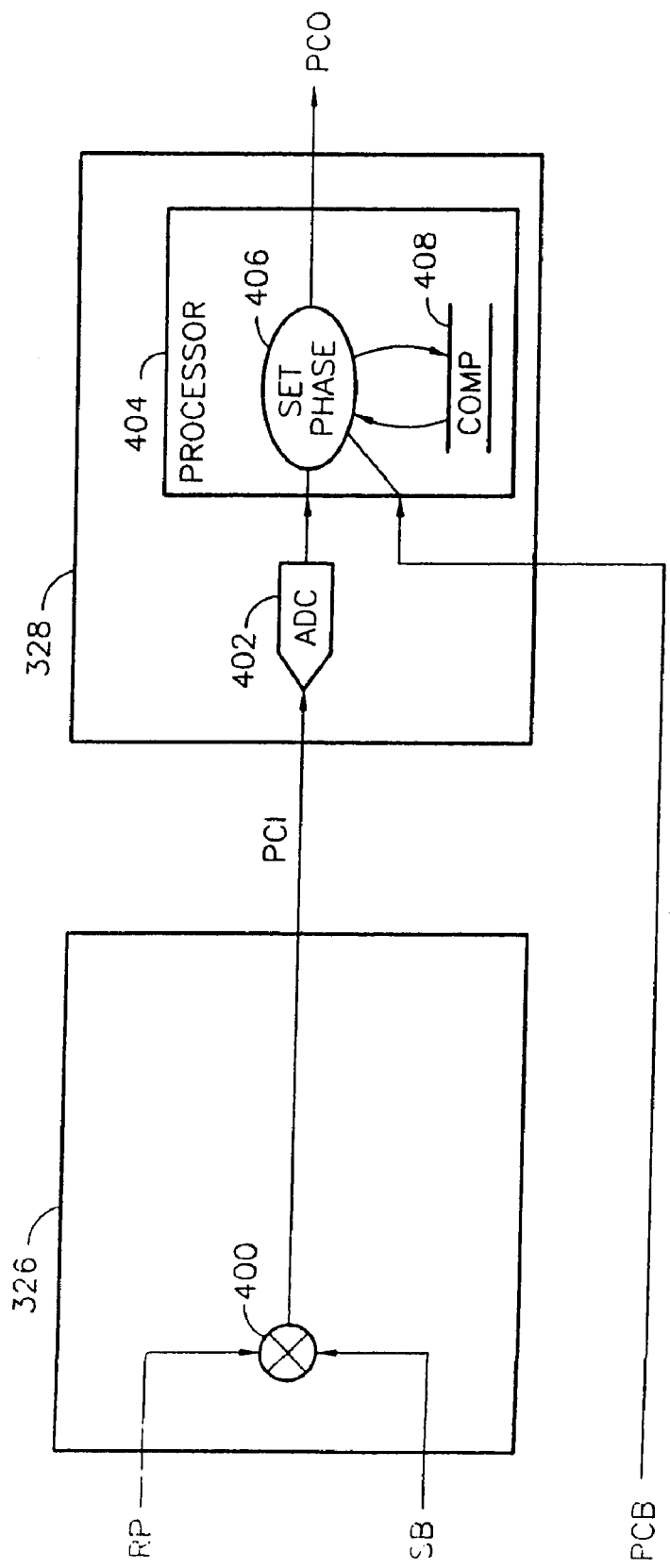
FIG. 4 is a functional block diagram of a portion of a channel circuit of FIG. 3.

A phase control circuit may include a processor that performs a method for assuring transmitter output signals conform to a desired set of phase relationships. Each channel circuit may include such a processor. In another implementation, one processor receives respective inputs from each channel circuit, provides respective outputs to each channel circuit, and performs the method in any conventional manner for all channel circuits (e.g., sequentially, multitasking, multithreading). For example, in the implementation shown in FIG. 4, compare circuit 326 includes a mixer 400 responsive to signals RP and SB as discussed above. Mixer 400 provides signal PCI to phase control circuit 328. Phase control circuit 328 includes ADC 402 and processor 404. Phase control circuit 328 employs conventional circuits and firmware for the purposes discussed herein. Signal PCI is subject to analog to digital conversion by ADC 402 and results are subject to processing by processor 404. Processor 404 in addition to ADC output, receives signal PCB and provides signal PCO.

In another implementation, processor 108 receives phase information signals (e.g., PCI in analog form or after conversion to digital form) from each channel circuit and provides phase control signals (e.g., PCO) to each phase shift circuit. Signals PCA, PCB, PCC, and PCD may be omitted; and, the phase control circuit (e.g., 328) may be omitted from each channel circuit.

As discussed above, a set phase process and compensation store may be implemented in each phase control circuit 328 (processor 404), in a processor common to all channel circuits (not shown), or in processor 108. For clarity of description, set phase process 406 and compensation store 408 will be described with reference to FIG. 4 as implemented in each phase control circuit 328, typical for a plurality of channel circuits (201 or 300).

Set phase process 406 reads from time to time indicia of a phase difference provided by ADC 402, reads from time to time indicia of a phase set point from signal PCB, reads and writes compensation values to compensation store 408, and provides adjustment values from time to time via signal PCO to implement any channel circuit functions discussed above. Set phase process 406 may perform at any suitable time (e.g., as directed by signal PCB) configuration control, phase control for omnidirectional transmitting, and phase control for directional transmitting.

Processor 108 may prescribe operating values for set phase process 406. Set phase process 406 may implement configuration control by reading such operating values and/or software from processor 108 as conveyed in any conventional manner by signal PCB. Operating values may include any suitable limit value, duration, repetition rate, period or software for channel circuit functions described above.

Phase control for omnidirectional transmitting may include setting an adjustment value of signal PCO based on signal PCI, ignoring any reference to a phase set point (if not zero) of signal PCB, and storing a compensation value in compensation store 408. As an example, consider the phase difference from signal TX to signal TA to be 5°. Consider the phase difference between TX and TB to be 2° with signal PCO directing phase shift circuit 320 to provide zero additional phase shift. Signal PCI reports a phase difference of 3° (5 minus 2). Set phase process 406 stores the value 3° in compensation store 408 and provides an adjustment value of 3° via signal PCO. Phase shift circuit 320 adds 3° to the delay TX to TB so that signal TA and TB are both 5° from signal TX. Consequently, a phase difference between TA and TB is zero (e.g., as desired per Table 1 row 1). Signal PCI also reports zero phase difference. Set phase process 406 may provide adjustment values in any conventional sequence (e.g., optimization) until a minimum phase difference is reported by signal PCI.

Phase control may include recalling a compensation value from compensation store 408, adding the recalled compensation value to a set point value read from signal PCB, and providing an adjustment value of signal PCO based on the sum. For example, if signal PCB prescribes a set point of 90°, set phase process 406 may recall a compensation value of 3° from store 408, form a sum of 93° (90 plus 3), and provide an adjustment value of 93° via signal PCO. Consequently, by operation of phase shift circuit 320, the phase difference between transmitter output signals TB (at 95° from TX) and TA (at 5° from TX) is 90° (95 minus 5), compensated for differing channel circuit delays.

The techniques described above facilitate transmitting in a plurality of modes with one or more antennas. For example, several modes are discussed above for directional transmitting and omnidirectional transmitting from a system 100 that includes one antenna 110 and may include a switch 203. A system 100 that uses multiple antennas may use these techniques to implement configuration changes among antennas and desired transmitting modes. Processor 108 may provide signals PCA-PCD with respective set point phases suitable for each antenna and transmitting mode. Processor 108 may include information on each phase control signal (PCA-PCD) that identifies an antenna and antenna port (or element) for suitable operation of phase control circuit 328. For instance compensation values stored in compensation store 408 may be indexed by antenna and antenna port (or element). Each phase control circuit may receive control signal SWC to determine or assist in determining what antenna and antenna port (or element) it will be coupled to.

Figure 5:
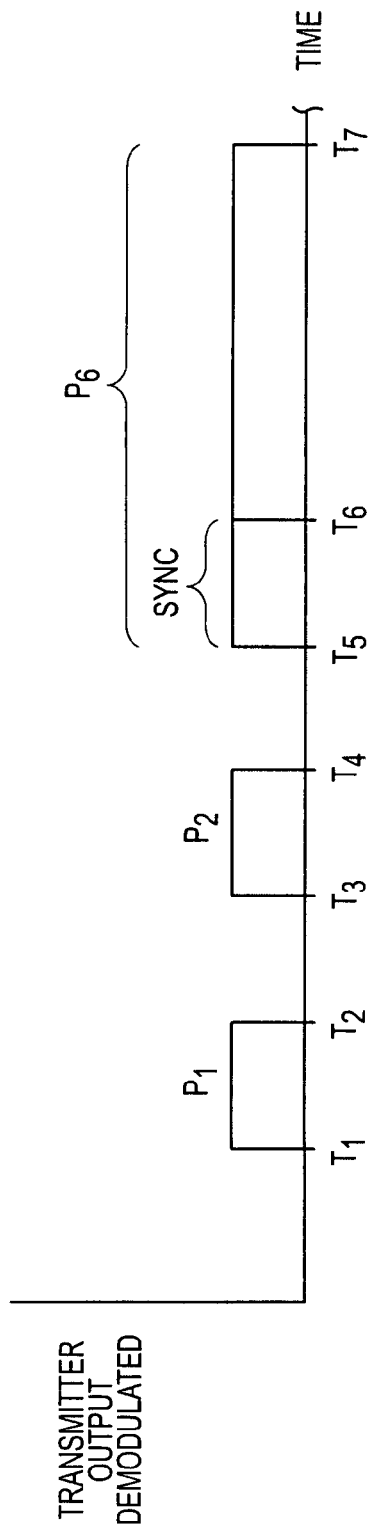
FIG. 5 is a timing diagram of a signal transmitted by the transmitter of FIG. 1.

Referring to FIG. 5, a waveform is shown that may be transmitted by avionics system 100. In this instance, the waveform may represent a TCAS transmission (e.g., an omnidirectional interrogation in a MODE S format) providing a pulse P1 from time $t_1$ to time $t_2$, a pulse P2 from time $t_3$ to time $t_4$ and a pulse P6 from time $t_5$ to time $t_7$, including in pulse P6 a synchronization period from time $t_5$ to time $t_6$. As discussed above, operation of sample circuit 314, sample circuit 324, compare circuit 326, phase control circuit 328, and phase shift circuit 320 may be simultaneous for closed loop control or may be individually operated during a sequence of times. In a preferred mode of operation, sample circuits 314 and 324 are operated simultaneously during a transmission of suitable duration to allow a reliable measurement of phase (signals RP and SB) or phase difference (signal PCI). For example, the duration of pulse P1, P2 or the sync portion of pulse P6 may be of sufficient duration. The sync portion of pulse. P6 is preferred when propagation delays through circuits 326 and 328 are sufficiently low to permit adjusting phase prior to sending data in the remainder of pulse P6 (e.g., from times $t_6$ to $t_7$).

Figure 6:
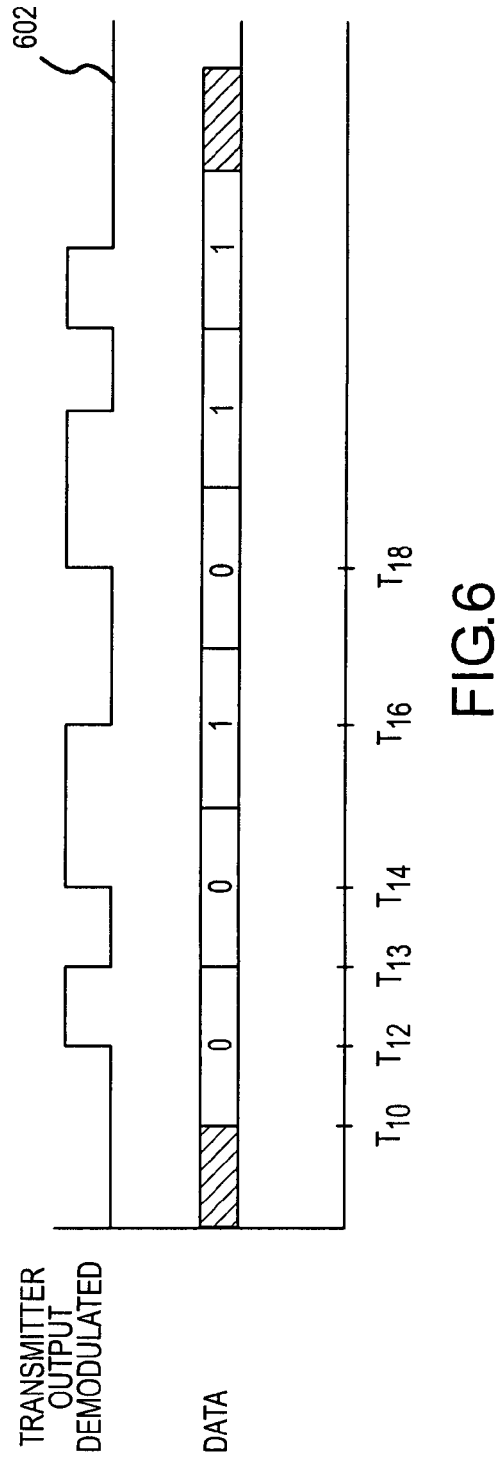
FIG. 6 is a timing diagram of another signal transmitted by the transmitter of FIG. 1.

Referring to FIG. 6, another waveform is shown that may be transmitted by avionics system 100. In this instance, the waveform 602 may represent part of a transmission from a transponder (e.g., an omnidirectional reply in a MODE S format). Waveform 602 conveys data in a binary pulse position modulation. When a "0" bit is followed by a "1" bit, a pulse (e.g., from times $t_{14}$ to $t_{16}$) is transmitted of sufficient duration to operate sampling circuits 314 and 324. An adjustment to phase may be implemented by circuits 326, 328, and 320 at any time while not transmitting e.g., from times $t_{16}$ to $t_{18}$, and/or while transmitting. Other implementation may include sampling circuits that respond more quickly for operation in shorter pulse durations (e.g., from times $t_{12}$ to $t_{13}$).

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method of transmitting from a traffic alert and collision avoidance system (TCAS) directional antenna, the TCAS directional antenna including a plurality of antenna elements connected to an integrated beam forming network, the method comprising:
   providing a signal to each input of the integrated beam forming network, wherein each signal is of equal phase and equal amplitude to result in transmitting omnidirectionally from the TCAS directional antenna.

2. The method of claim 1, wherein the signal is a Mode S transmission.

3. The method of claim 1, wherein the signal is a universal access transceiver (UAT) transmission.

4. The method of claim 1, wherein the signal is a TCAS transmission.

5. The method of claim 1, wherein the signal has a frequency of 1090 MHz, 978 MHz, or 1030 MHz.

6. The method of claim 1, further comprising providing a signal to a single input of the integrated beam forming network to result in transmitting directionally from the TCAS directional antenna.

7. A system for transmitting from a TCAS directional antenna, the TCAS directional antenna comprising a plurality of antenna elements connected to an integrated beam forming network, the system comprising:
   a transmitter in communication with the TCAS directional antenna, the transmitter for providing a signal to each input of the integrated beam forming network, wherein each signal is of equal phase and equal amplitude to result in transmitting omnidirectionally from the TCAS directional antenna.

8. The system of claim 7, wherein the signal is a Mode S transmission.

9. The system of claim 7, wherein the signal is a universal access transceiver (UAT) transmission.

10. The system of claim 7, wherein the signal is a TCAS transmission.

11. The system of claim 7, wherein the signal has a frequency of 1090 MHz, 978 MHz, or 1030 MHz.

12. The system of claim 7, wherein the transmitter provides a signal to a single input of the integrated beam forming network to result in transmitting directionally from the TCAS directional antenna.

13. A system for transmitting from a TCAS directional antenna, the TCAS directional antenna comprising a plurality of antenna elements connected to an integrated beam forming network, the system comprising:
   a circuit in communication with the TCAS directional antenna, the circuit for receiving a first signal and providing a second signal to each input of the integrated beam forming network, wherein each second signal is of equal phase and equal amplitude to result in transmitting omnidirectionally from the TCAS directional antenna.

14. The system of claim 13, wherein amplitude of the first signal is a multiple of the amplitude of the second signal.

15. The system of claim 13, wherein the first signal is a Mode S transmission.

16. The system of claim 13, wherein the first signal is a universal access transceiver (UAT) transmission.

17. The system of claim 13, wherein the first signal is a TCAS transmission.

18. The system of claim 13, wherein the signal has a frequency of 1090 MHz, 978 MHz, or 1030 MHz.

19. The system of claim 13, wherein the circuit provides the first signal to a single input of the integrated beam forming network to result in transmitting directionally from the TCAS directional antenna.

* * * * *